United States Patent [19]

Isobe et al.

[11] Patent Number: 5,578,986

[45] Date of Patent: Nov. 26, 1996

[54] CAR DISPLAY LAMP

[75] Inventors: Hiroshi Isobe; Tsugetaka Isobe, both of Aichi-ken, Japan

[73] Assignee: Tatsumi Co., Ltd., Aichi-ken, Japan

[21] Appl. No.: 367,226

[22] PCT Filed: Dec. 27, 1993

[86] PCT No.: PCT/JP93/01911

§ 371 Date: Jan. 17, 1995

§ 102(e) Date: Jan. 17, 1995

[87] PCT Pub. No.: WO95/18027

PCT Pub. Date: Jul. 6, 1995

[51] Int. Cl.⁶ .................................................. B60Q 1/34
[52] U.S. Cl. .................. 340/475; 340/463; 340/461; 340/471; 340/464; 340/479
[58] Field of Search ...................... 340/479, 463, 340/461, 471, 464

[56] References Cited

U.S. PATENT DOCUMENTS 4,361,828  11/1982  Hose ........................... 340/468
4,631,516  12/1986  Clinker ........................ 340/464

FOREIGN PATENT DOCUMENTS 63-82645  5/1988  Japan .
4-99146   8/1992  Japan .

*Primary Examiner*—Jeffrey Hofsass
*Assistant Examiner*—Daryl C. Pope
*Attorney, Agent, or Firm*—Oblon, Spivak, McClelland, Maier & Neustadt, P.C.

[57] ABSTRACT

There is provided a car display device (100) mainly comprising a control unit (20), clips (30R, 30L), and a plug (40) for power source. An on-off signal which has a predetermined period to flash turn signal lamps ($L_L$, $L_R$) is input through either of the clips (30R, 30L) and its duration is begun to time. Then, a reference time for judgment is set to be longer than one period and shorter than two periods of the on-off signal. If the duration of the on-off signal is shorter than that of the reference times, the car display device 100 is actuated and the turn signal lamps ($L_L$ and $L_R$) are being flashed for a predetermined time, simultaneously. Thus, the car display device (100) of the present invention has a simple construction and enables to send appreciation signals to a driver in a succeeding car with certainty.

6 Claims, 13 Drawing Sheets

CAR DISPLAY LAMP

FIELD OF THE INVENTION

The present invention relates to a car display lamp which sends thanks signal to a succeeding car for getting ahead of and letting cut into a line of cars.

BACKGROUND OF THE INVENTION

When drivers get ahead of and cut into a line of cars, it is a kind of courtesy for them to show their appreciation to a succeeding car in some way.

Conventionally, they raise their hand or turn on and off their turn signal lamps or head lamps to show their appreciation directly or indirectly.

DISCLOSURE OF THE INVENTION

In order to concentrate on driving, such actions should be easy and certain to convey their messages as much as possible. A driver, however, will be distracted by expressing thanks by raising hand and by flashing his turn signal lamps or head lamps. Those actions require extra operations beyond normal driving.

Further, even such actions are doubtful to convey the intention of the drivers with certainty.

In order to solve such problems, it is an object of this invention to provide a display lamp to convey appreciation of a driver to others with much easier and surer way with lesser extra operations beyond normal driving.

According to the present invention, there is provided a car display device which detects an on-off signal with a predetermined period to flash turn signal lamps of a car and actuates a display for a predetermined display period when one on-off signal is detected during a predetermined time. Alternatively, simultaneous flashing of turn signal lamps of a car can be used in spite of the display.

Control means comprises the first timer (23) which outputs duration signals (B, E) showing a duration in which the on-off signal is continuously output, the duration being determined by that first timer is reset and restarted at every level transfer of the on-off signal, with beginning to measure time in synchronization with a level transfer of the on-off signal with a predetermined period to flash turn signal lamps and measuring a first predetermined time which is longer than one period and shorter than two periods of said on-off signal, second timer (24) which outputs a reference signal (D) showing the reference time when a second predetermined time passed after the beginning of the duration shown by the duration signal B, by being reset and restarted in synchronization with the beginning of the duration of the duration signal (B) and by measuring the second predetermined time which is longer than the first predetermined time of the first timer and shorter than two periods of the on-off signal, and signal output means (25, 26) which outputs a display signal (G) for a predetermined display time to actuate the display device when it is judged from both the duration signal (E) and the reference signal that the duration is over at the reference time.

Alternatively, control means can also comprises timer means (32, 324, 230) which decides a duration in which the on-off signal is continuously output, the duration being determined by that the timer is reset and restarted at every level transfer of the on-off signal, with beginning to measure time in synchronization with a level transfer of said on-off signal and measuring a predetermined time which is longer than one period and shorter than two periods of the on-off signal, level transfer detection means (322, 324, 240) which detects the level transfer of the on-off signal while the timer means is measuring time in the duration, and signal output means (322, 250, 260) which outputs a display signal for a predetermined display time to actuate the display when the predetermined time has passed without any detections of the level transfer by the level transfer detection means.

Further, the constitution of another embodiment is characterized in that period detection means (322, 324, 280, 290) which detects a period of level transfer of the on-off signal to flash the turn signal lamps is comprised and that a predetermined time to measure time by timer means is set based on the period detection means. In this ease, the car display can be installed in a ear which has a different period of the on-off signal.

The first timer measures a level transfer of an on-off signal as a timer means. It begins to measure time in synchronization with level transfer of an on-off signal with a predetermined period to flash turn signal lamps. The first timer also measures the first predetermined time which is longer than one period and shorter than two periods of the on-off signal. Further, the first timer is reset and restarted at every level transfer of the on-off signal. In other words, when the on-off signal is output and its level transfers with a predetermined time, the first timer renews a period after the beginning of timing, recognizes the renewed duration, and outputs a duration signal corresponding to its renewed duration.

The second timer is reset and restarted in synchronization with the beginning of a duration by a duration signal output by the first timer. The second timer measures the second predetermined time which is longer than the first predetermined time by the first timer and shorter than two periods of the on-off signal. Further, the second timer outputs a reference signal to decide a reference time when the second predetermined time has passed after the beginning of the duration by the first timer.

When the on-off signal transfers its level once, the first predetermined time will be the duration signal output by the first timer. Since the reference signal output by the second timer is set longer than the first predetermined time, the duration output by the first timer is over at the reference time by the second timer. Therefore, a display signal to actuate display is output by signal output means.

When the on-off signal transfers its level twice, the duration signal is obtained by adding a period of the on-off signal to the first predetermined time. Since the first predetermined time is longer than a period of the on-off signal, the duration will be longer than two periods of the on-off signal. Namely, the duration output by the first timer is not over at the reference time output by the second timer. Therefore, the display signal to actuate the display is not output.

Similarly, when the on-off signal transfers its level more than three times, the display signal is not output to the display.

The control means judges whether one or successive plural pulses of the on-off signal, which is to flash turn signal lamps, exist within the duration output by the first timer. When a pulse exists within the duration, a display signal is output to the display to show an appreciation signal. When successive plural pulses exist within the duration, turn signals flash for usual turning directions.

In another embodiment, timer means functions as same as the first timer as described above. Level transfer detection means detects any level transfers of the on-off signal for a duration decided by the timer means. When there is no input of a new on-off signal within the duration decided by the timer means, the level transfer detection means judges of no detection of the on-off signal and the signal output means outputs a display signal to the display to actuate it. On the contrary, when a new on-off signal is input within the duration, the level transfer detection means detects a level transfer of the on-off signal and the signal output means does not output the display signal to the display.

In the other embodiment, the first predetermined time counted in the first timer, the second predetermined time counted in the second timer, and the predetermined time counted in the timer means are set based on the period of the actually detected on-off signal to flash turn signals as same as in the former embodiment. Therefore, the car display device in this embodiment can be installed in other cars even they have different periods of the on-off signal.

Further, in the other embodiment, turn signal lamps function as a display. Simultaneous flashing of the turn signal lamps for a predetermined display time shows appreciation to other drivers. In this case, there is no need to install any displays.

PREFERRED EMBODIMENTS OF THE INVENTION

The invention will be more fully understood by reference to the following examples.

EXAMPLE 1

Figure 1:
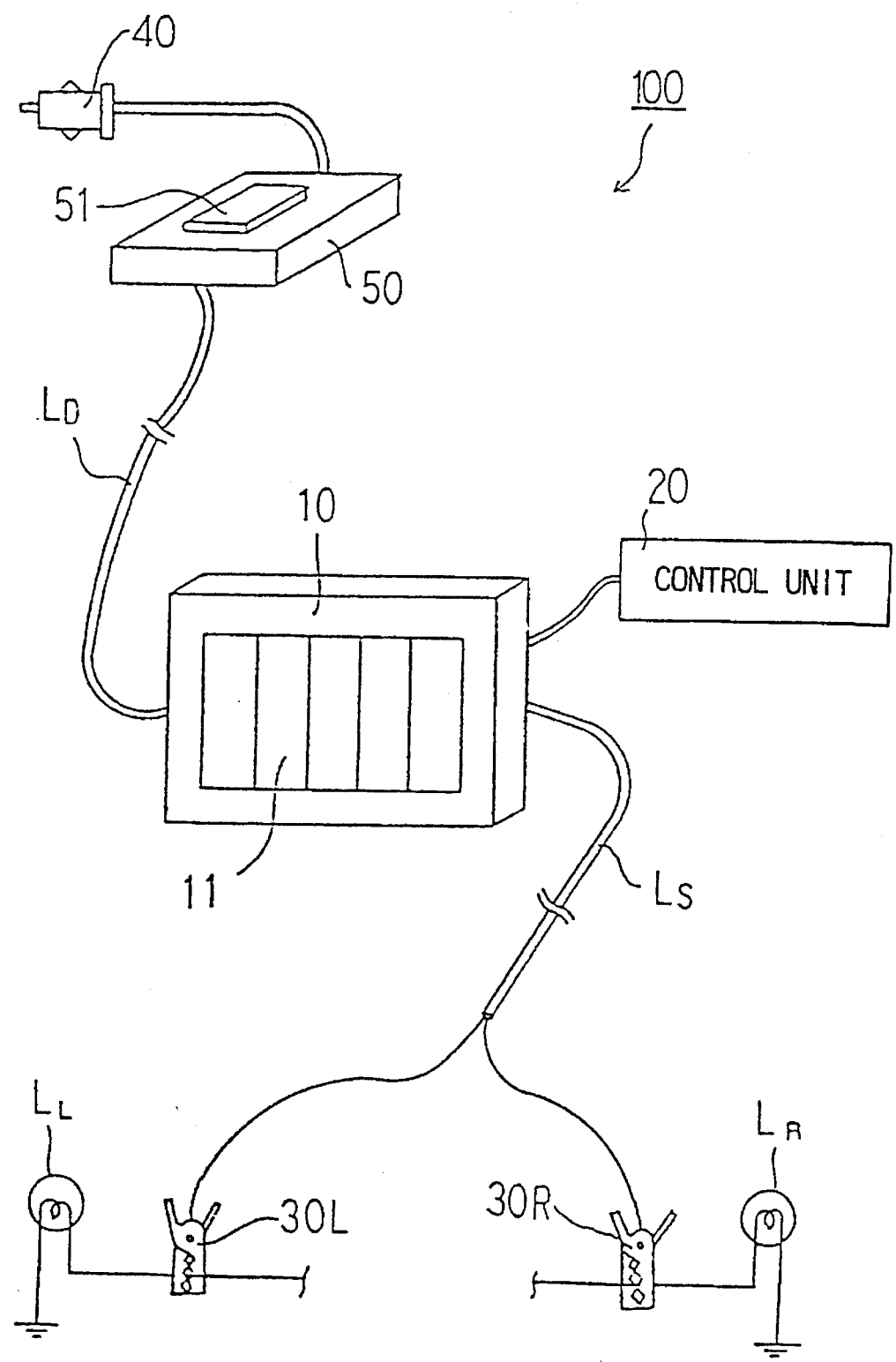
FIG. 1 is a constitutional figure of a car display device in the first embodiment of this invention.

With reference to FIG. 1, there is shown a car display device 100 mainly comprising a display 10, clips 30R and 30L, a plug socket 40 for power source, and a confirmative lamp 50. A display panel 11 on the display 10 is manufactured to be lighted by lamps installed inside the device 10 or by LEDs arranged in lines on the plane 11. The panel 11 of the display 10 is placed where the driver of a succeeding car can see words thereon easily, such as inside rear window. A control unit 20 which is later described is connected with the display 10.

The clips 30R and 30L are wired at the edge of a signal input line $L_s$ to detect either of the turn signals $S_R$ and $S_L$. They are on-off signals which have a predetermined period to flash either of the turn signal lamps $L_R$ and $L_L$. The clips 30R and 30L are electronically connected with signal lines of the rear turn signal lamps $L_R$ and $L_L$ which are wired in trunk of the car. The turn signal lamps of front and rear are connected in parallel to each other in each side of right and left and, thus, flashed, simultaneously.

The plug 40 for power source is plugged into a cigarette lighter socket which is not shown in FIG. 1 and provides the control unit 20 with electric power through a power supply line $L_D$.

The confirmative lamp 50 is placed on the power supply line between the plug 40 and the display 10. Lightening of the confirmative lamp 50 tells that the display 10 is on. This confirmative lamp 50 is placed on a certain place of an instrumental panel which is easy for the driver to check and does not stymie other lamps.

Further, the central part of the confirmative lamp 50 is functioned as a push button 51. Whenever the button is pushed, it enables to interrupt the operation of the car display device 100 even in the middle of its operation.

Figure 2:
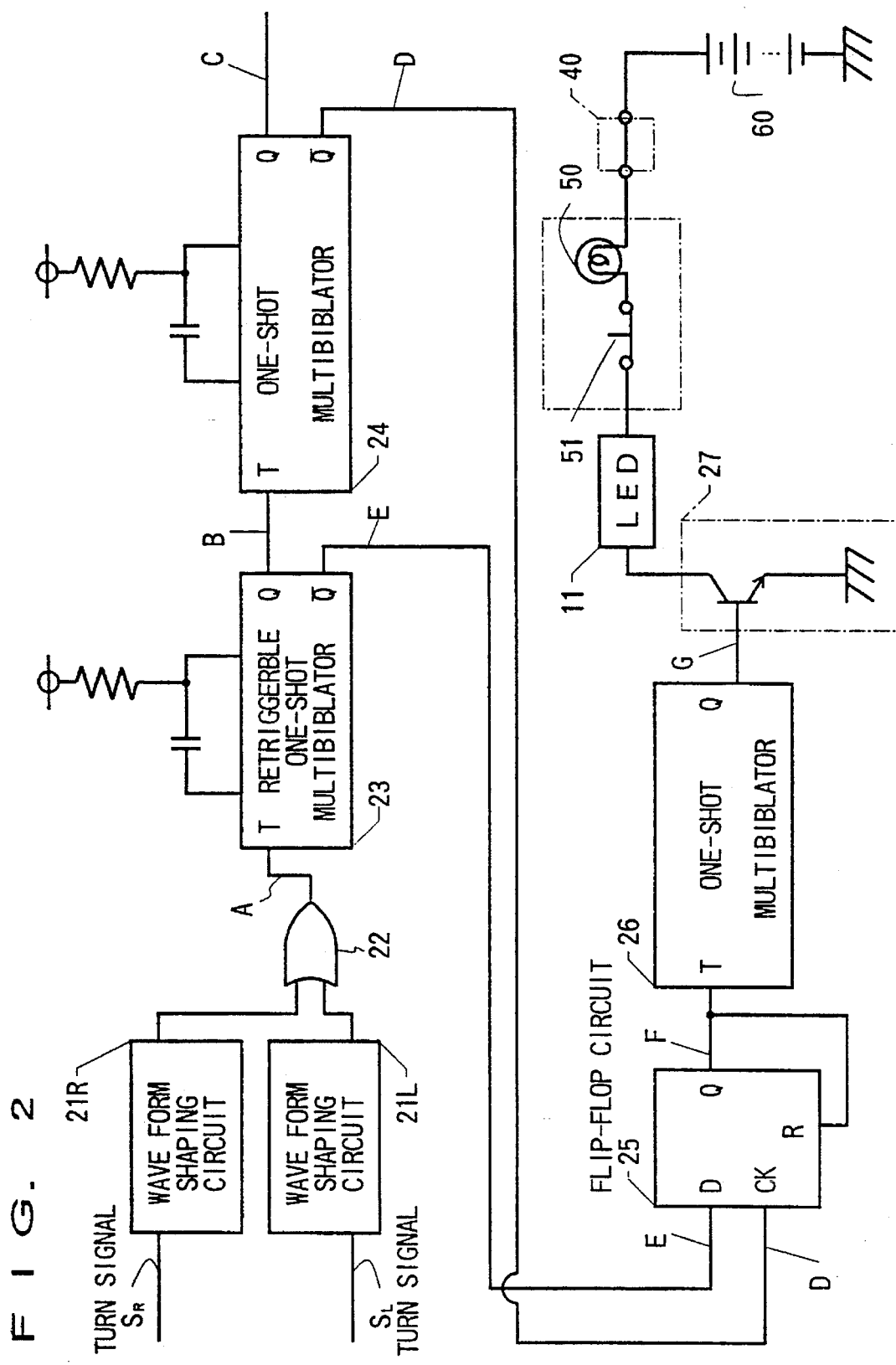
FIG. 2 is a block diagram showing a control unit of a display of the display device in the first embodiment.

With reference to FIG. 2, there is shown a block diagram of the control unit 20. Either of the turn signals $S_R$ and $S_L$ is output to the respective turn signal lamps $L_R$ and $L_L$ by an operation of a turn signal lever which is not shown in FIG. 2. Either of the output signals $S_R$ and $S_L$ is detected by the respective clips 30R and 30L which are electrically connected to the respective signal lines of the turn signal lamps $L_R$ and $L_L$ and is input to respective wave-form shaping circuits 21R and 21L through the signal input line $L_S$.

After either of the output signals $S_R$ and $S_L$ is shaped into a square wave by the respective wave-form shaping circuits 21R and 21L, it is output to an OR gate 22. An output signal A from the OR gate 22 is input to an input terminal (T) of a retriggerble one-shot multibibrator 23 functioning as a first timer whose continuity period is about one second. The period is the first predetermined time. The period of the output signal A is about 0.7 second.

An output signal B from an output terminal (Q) of the retriggerble one-shot multibiblator 23 is input to an input terminal (T) of a one-shot multibiblator 24 functioning as a second timer whose continuity period is about 1.2 seconds. The period is the second predetermined time. An output signal E from an output terminal (–Q) of the retriggerble one-shot multibiblator 23 is input to an input terminal (D) of a flip-flop circuit 25 functioning as a judging means.

A signal C is output from an output terminal (Q) of the one-shot multibiblator 24. An output signal D from an output terminal (–Q) of the one-shot multibiblator 24 is input to a clock input terminal (CK) of the flip-flop circuit 25. An output signal F from an output terminal (Q) of the flip-flop circuit 25 is input both to its own reset input terminal (R) and to an input terminal (T) of a one-shot multibiblator 26.

An output signal G from an output terminal (Q) of the one-shot multibiblator 26 is output to a base of a transition constructing a display circuit 27.

The control unit 20 is constituted as mentioned above. While the output signal G is input to the display circuit 27, the panel 11 displays signs thereon.

A corrector of the transistor installed in the display circuit 27 is connected to a car battery 60 through the LED which is arranged on the panel 11 and the plug 40 for power source. Further, between the panel 11 and the plug 40, the confirmative lamp 50 and the push button 51 are connected in series. As described earlier, lighting of the confirmative lamp 50 can tell the driver that the display 10 on the panel 11 is working. Pushing the push button 51 enables to interrupt the operation of the display device 100. Further, a delay timer which has a longer set time than the duration time of the output signal G is installed in the push button 51. Thus, once the display circuit 27 is turned off by pushing the push button 51, the circuit 27 remains off during the set time in spite of inputting the signal G. Nothing is displayed on the panel 11 this time.

Figure 3:
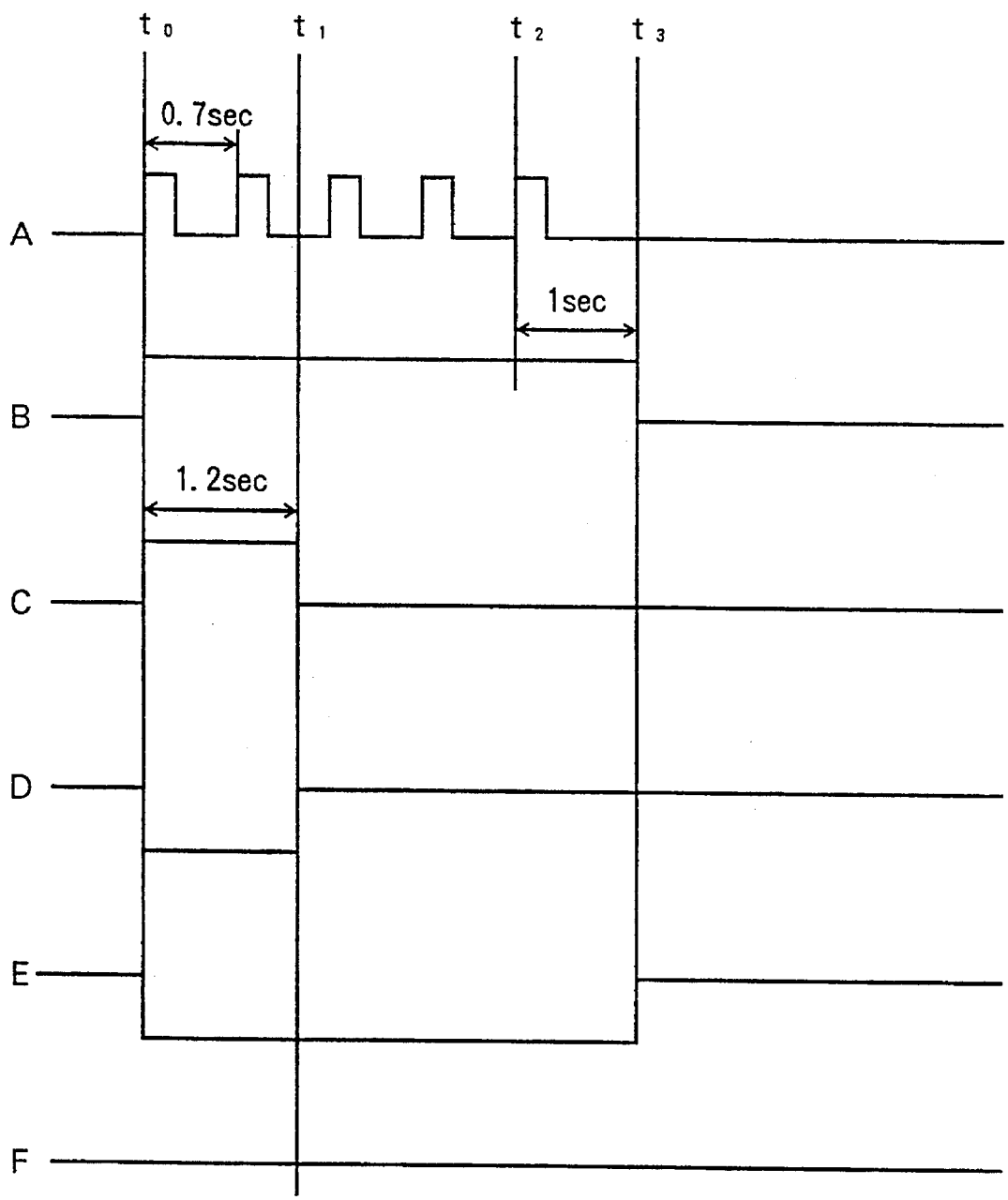
FIG. 3 is a timing chart showing signal conditions of each signal line when a turn signal is input into the control unit in FIG. 2 more than once for turning direction in the first embodiment.

With reference to FIG. 3, operation of the display device 100 is explained when a car turns direction ordinarily.

When a car turns ordinarily, either of the turn signals $S_R$ and $S_L$ is input to the respective wave-form shaping circuits 21R and 21L. As shown in FIG. 3, a rectangular wave which is a constituent of the signal A is repeatedly output by the OR gate 22 at an interval of about 0.7 second. For example in this case, the rectangular wave is repeatedly output five times as the signal when the car turns right.

The signal B output from the retriggerble one-shot multibiblator 23 rises and starts simultaneously with rising of the signal A at $t_O$. Namely, the signal B is repeatedly reset for each rising of the signal A at an interval of about 0.7 second. The signal B falls at $t_3$ one second later after the fifth rectangular wave of the signal A rises at $t_2$. Namely, the signal B becomes a duration signal keeping high level for about 3.8 seconds (=(0.7×4)+1). The signal E output from the retriggerble one-shot multibiblator 23 is an inversion of the signal B.

The signal C output from the one-shot multibiblator 24 rises and starts simultaneously with rising of the signal A at $t_O$ and falls about 1.2 seconds later when its set time is up. Namely, the signal C keeps high level for about 1.2 seconds and becomes a reference signal. The signal D output from the one-shot multibiblator 24 is inversion of the signal C.

Then, the signal D keeps low level for about 1.2 seconds and the signal E does for about 3.8 seconds in the flip-flop circuit 25. In result, the signal F from the output terminal (Q) of the flip-flop circuit 25 remains low level since electric voltage of the input terminal (D) of the flip-flop circuit 25 shows high level at a reference time $t_1$ when the voltage of the clock input terminal (CK) is transferred from low to high level.

Suppose that a turn signal $S_R$ is input twice and that two rectangular waves are output from the wave-form shaping circuit 21R as the signal A. Then, the signal B shows high level for about 1.7 seconds (=0.7+1) and the signal F does not transfer to high but remains low level as described above.

Figure 4:
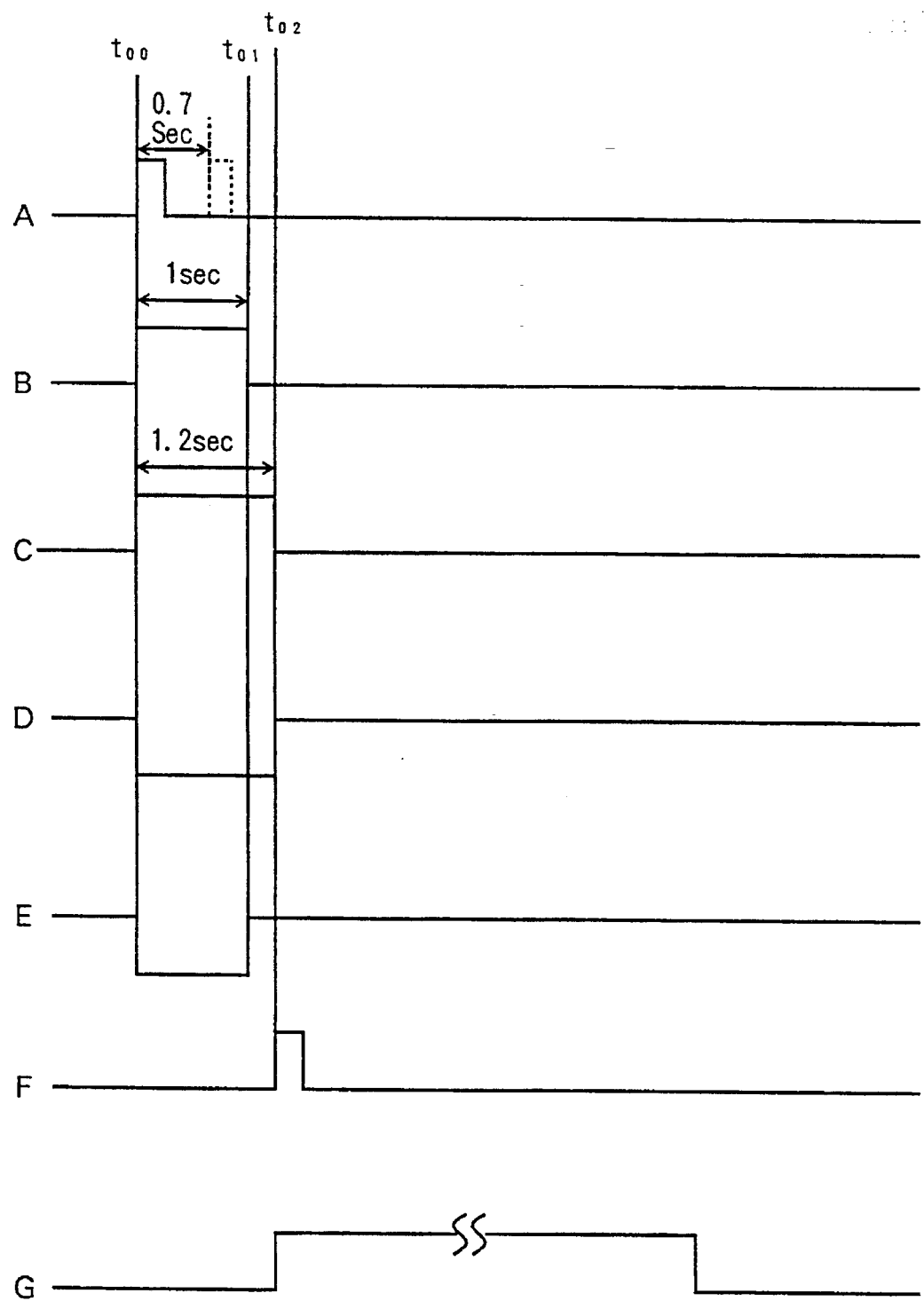
FIG. 4 is a timing chart showing signal conditions of each signal line when a turn signal is input into the control unit in FIG. 2 once for actuating the display in the first embodiment.

Referring to FIG. 4, there is explained a case in which the display device 100 is triggered. As shown in FIG. 4, a turn signal $S_R$, i.e. the signal A, is output in a rectangular wave form shaping circuit 21R.

Then, the signal B from the retriggerble one-shot multibiblator 23 rises simultaneously with rising of the signal A at $t_{00}$ and fails about 1 second later at $t_{01}$. Namely, the signal B keeps high level for about 1 second and becomes a duration signal.

On the contrary, the signal E output from the retriggerble one-shot multibiblator 23 is inversion of the signal B.

The signal C from the one-shot multibiblator 24 rises simultaneously with rising of the signal A at $t_{00}$ and falls about 1.2 seconds later at $t_{02}$. Namely, the signal C keeps high level for about 1.2 seconds and becomes the reference signal.

On the contrary, the signal D from the one-shot multibiblator 24 is inversion of the signal C.

The signal D keeps low level for about 1.2 seconds in the flip-flop circuit 25 and the signal E does for about 1 second. The electric voltage of the input terminal (D) is transferred from low level to high at the reference time $t_{02}$ when the voltage of the clock input terminal (CK) is transferred from low to high level. The signal F output from the output terminal (Q) of the flip-flop circuit 25 rises from low to high level at the reference time $T_{02}$. Further, the flip-flop circuit 25 is reset simultaneously with the rising of the signal F which becomes a pulse signal with a certain width.

Then, the signal G output from the one-shot multibiblator 26 rises simultaneously with rising of the signal F at $t_{02}$ and falls after a certain period, for example, 5 seconds. Namely, the signal G is being output to the display circuit 27 during the certain period and actuates the display device 10.

As mentioned above, the display device 100 of this invention does not require any additional switches nor buttons to input signals since the turn lever originally installed near a handle functions both as a turn lever and a switch of the display device 100. The operation of the turn lever for actuating the display device 100 is as same as that for inputting turn signals. The number of the operation is just needed to be limited to once. Therefore, the driver can concentrate on driving itself and nothing distracts him from driving.

In other words, a simple operation of the turn lever makes it possible for the driver to convey his appreciation of being let in a line of cars to the driver of the succeeding car with certainty, for example by showing a display with words of "thanks". Such action can be expected to enhance communication among drivers which has not seen before.

The display 10 with the panel 11 is used for this embodiment. Alternatively, a combined performance can be used, for example, a doll or a stuffed animal bows while the panel 11 displays words thereon.

EXAMPLE 2

The constitution of the car display device of this embodiment is as same as that of FIG. 1 except the control unit 20. It comprises a computer system in this embodiment. The control unit 20 is designed to detect a period of an on-off signal actually which flashes turn signals and calculate a set time based on that period.

Figure 5:
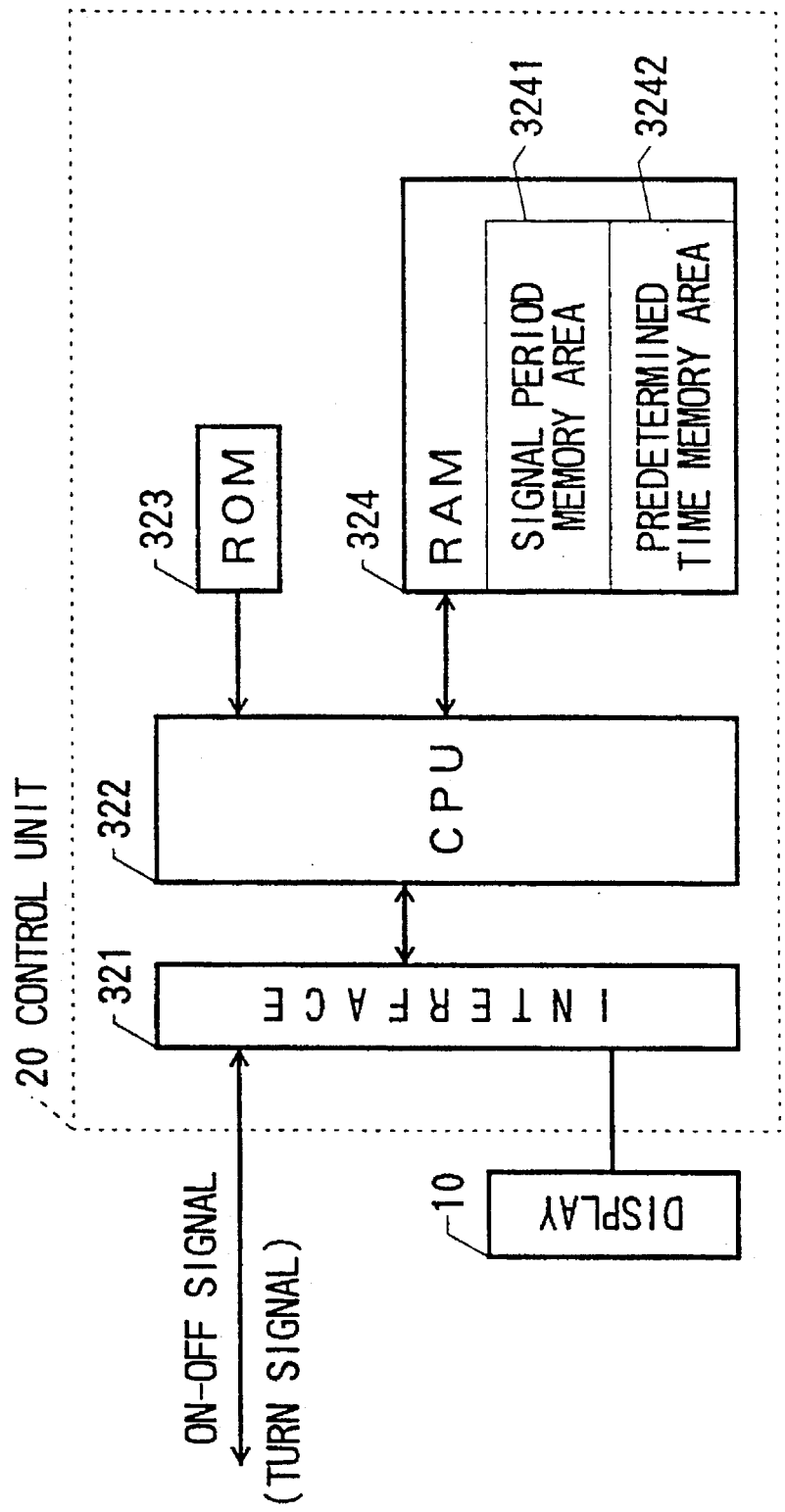
FIG. 5 is a block diagram showing a control unit of the display device in the second embodiment of this invention.

With reference to FIG. 5, there is shown a block diagram showing the constitution of the control unit 20 of the display device 100 in this embodiment. The control unit 20 comprises an interface 321, a CPU 322, a ROM 323 which memorized a control program, and a RAM 324 which memorizes each kind of data. The on-off signal which flashes the turn signal is input to the CPU 322 through the interface 321. An output signal from the CPU 322 is input through the interface 321 to the display 10 and actuates it.

The RAM 324 comprises a signal period memory area 3241 which stores periods of on-off signals and a predetermined time memory area 3242 which stores a predetermined time interval based on the periods of the on-off signals. The contents of the memory areas 3241 and 3242 are updated per input of a turn signal as described later.

Figure 6:
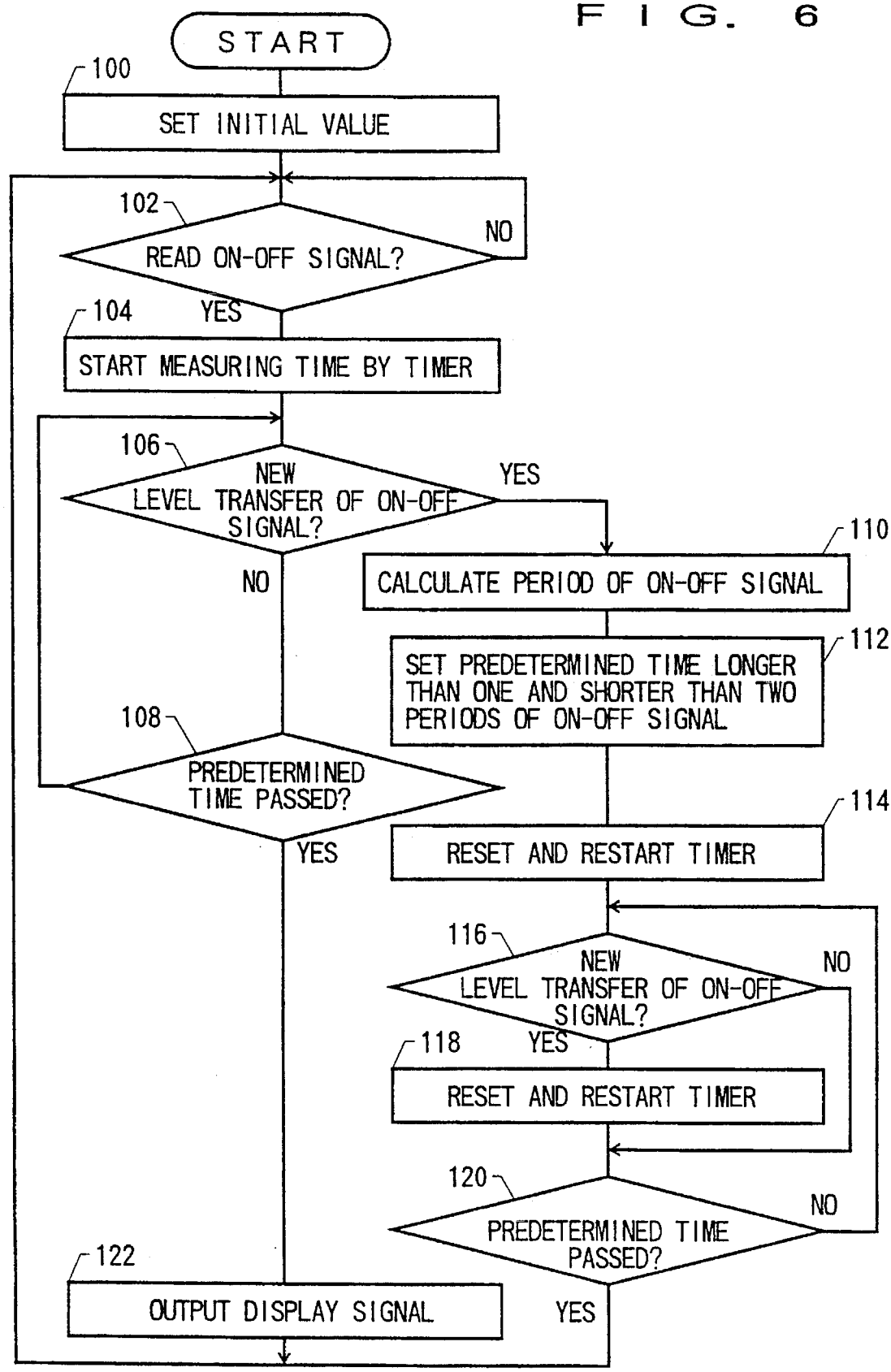
FIG. 6 is a flow chart showing the process steps of a CPU in the second embodiment of this invention.
Figure 7:
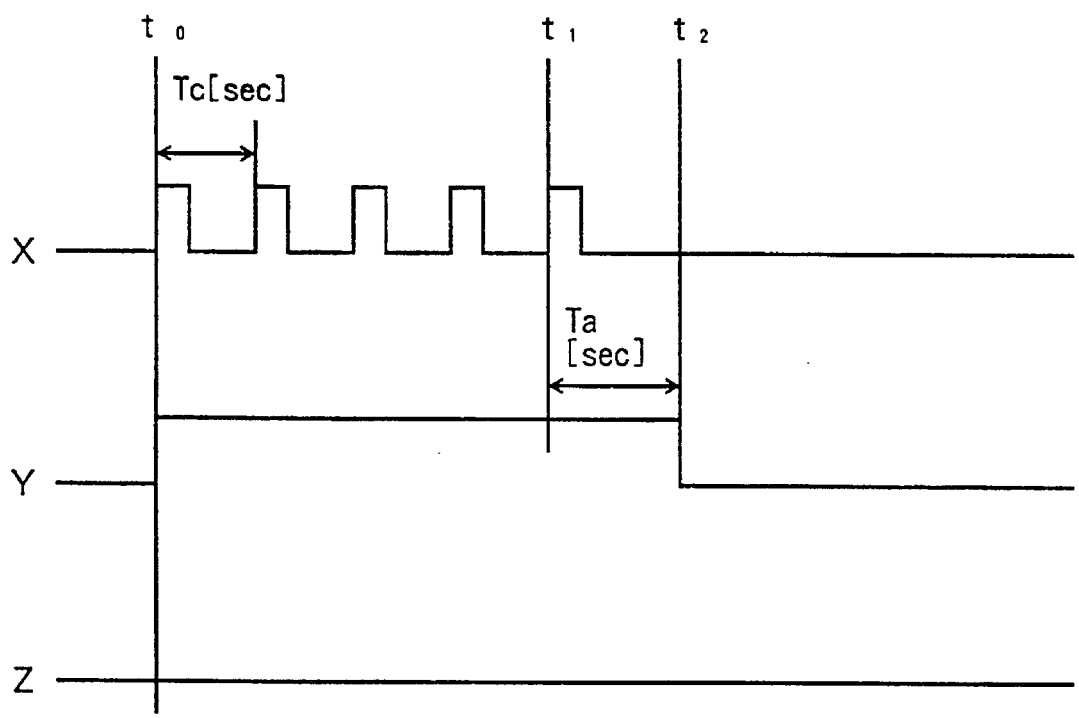
FIG. 7 is a timing chart explaining the case that a turn signal is input more than once for turning direction in the second embodiment.
Figure 8:
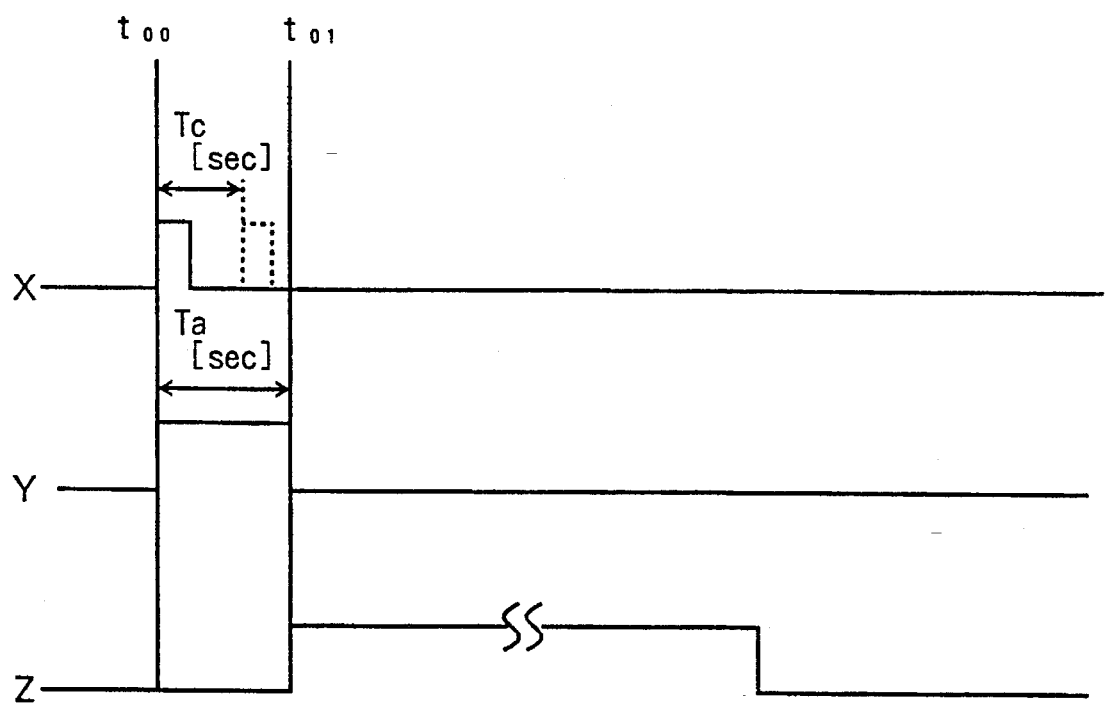
FIG. 8 is a timing chart explaining the case that a turn signal is input once for actuating the display in the second embodiment.

With reference to the flow chart in FIG. 6 showing the process steps of the CPU 322 in this embodiment, the timing charts in FIGS. 7 and 8 are explained. The timing chart in FIG. 7 corresponds to a case of ordinal turning direction flashing a turn signal. The timing chart in FIG. 8 corresponds to a case of actuating the display device to show appreciation to others in this embodiment.

When an ignition switch becomes on, the control unit 20 is initialized at step 100. Then, the process proceeds to step 102 and waits for an input of an on-off signal X, or a level transfer, before it proceeds to next step 104 and timing begins. (The time $t_0$ in FIG. 7 corresponds to step 104.)

Then, at step 106, level transfer of the on-off signal X is examined. The examination at step 106 is repeatedly carried out until a predetermined time Ta passes at step 108. The predetermined time Ta is not only an initialized value at step 100, but also the longest period of a turn signal output by an operation of turn signal lever. For example, the predetermined time Ta is set at 2 seconds in advance.

First, here are explained processing signals in case of an ordinal turning direction flashing a turn signal referring to FIG. 7.

The process is transferred to next step 110 since the next pulse is input and the signal level rises before the predetermined time Ta is over. At step 110, a time Tc of pulses of the on-off signal X which are read at steps 102 and 106 is calculated and stored in the signal period memory area 3241 of the RAM 324.

Then, at step 112, a predetermined time Ta is updated to be longer than one and shorter than two periods of the on-off signal X calculated at step 110, replacing its initial value. The renewed value is stored in the predetermined time memory area 3242 of the RAM 324.

The period Tc of the on-off signal and the predetermined time Ta show a relation 2Tc>Ta>Tc satisfying the formula, for example, Ta=Tc ×1.5.

After the timer for counting the predetermined time Ta is reset and begins again at step 114, the process proceeds to the next step 116. At step 116, the on-off signal X is examined whether its level becomes high or not as mentioned at step 106. When a level transfer is recognized, the process leads to step 118 and the timer for counting the predetermined time Ta set at step 112 is reset and begins again. (This process corresponds to a period from $t_0$ to $t_1$ shown in FIG. 7.)

When no level transfer is recognized after the predetermined time Ta passes at step 120, the on-off signal X, or a series of turn signals, is judged to be over. Then, the process step is transferred to the first step 102 and waits for an input of the next on-off signal for the same process as mentioned above. A display signal Z is prohibited from being output during a duration Y which corresponds to the period from $t_0$ to $t_2$ in FIG. 7 and is based on the on-off signal X.

Second, here are explained processing signals in case of actuating the display device of this embodiment with reference to FIG. 8.

After an on-off signal X is read at step 102, the process proceeds to step 104 and begins to count a time period. (The time $t_{00}$ in FIG. 8 corresponds to step 104.)

At step 106, level transfer of the on-off signal X is examined. The examination is repeatedly carried out until a predetermined time Ta passes at step 108. The process leads to step 122 since no level transfer is recognized by the time the predetermined time Ta is over at $t_{01}(=t_{00}-Ta)$.

At step 122, a display signal Z is output to the display 10. Then, the process step is transferred to the first step 102 and waits for the next on-off signal for the same process as mentioned earlier.

When an operation of turn signal lever is carried out once soon after an ignition switch becomes on, the display signal Z is output soon after the predetermined time Ta, for example 2 seconds which is set a little longer, is over.

As described in the first embodiment, the second embodiment can also obtain as same effects as the first one.

EXAMPLE 3

Figure 9:
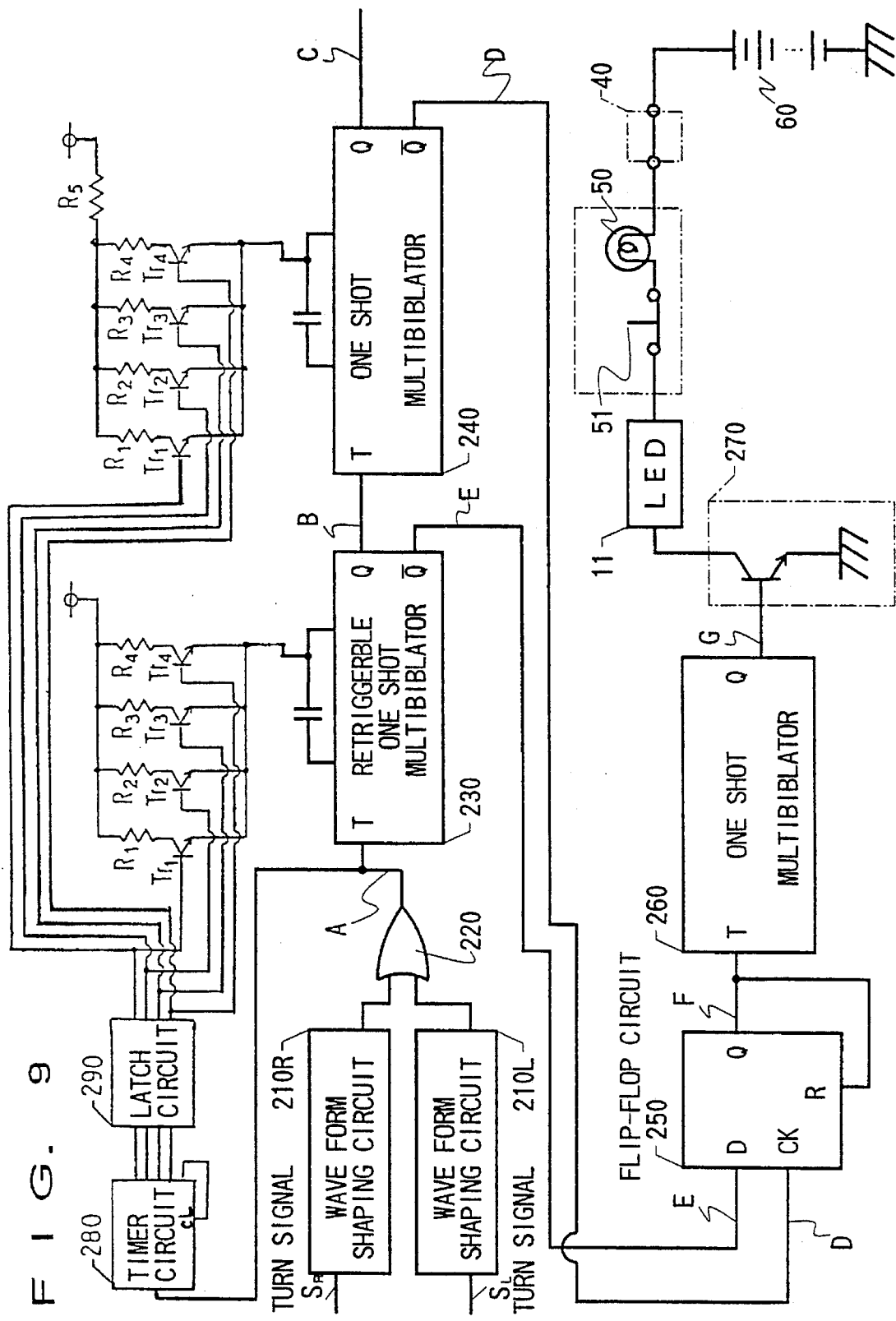
FIG. 9 is a block diagram showing a control unit of the display device in the third embodiment of this invention.

With reference to FIG. 9, there is shown a block diagram showing the control unit of the car display device 100 employed in the third embodiment.

The constitution of the hardware is as same as that of the first embodiment. The control unit 20 in this embodiment is designed to detect a period of an on-off signal actually and set a predetermined time based on the on-off signal as described in the second embodiment.

As mentioned in the first embodiment, either of the turn signals $S_R$ and $S_L$ is output to respective wave-form molding circuits 210R and 210L, and, then, output to an OR gate 220. The output signal A from the OR gate 220 is input both to an input terminal (T) of a retriggerble one-shot multibiblator 230 and an timer circuit 280 which counts a period Tc of the on-off signal A. The output from the timer circuit 280 is input both to the retriggerble one-shot multibiblator 230 and an one-shot multibiblator 240 through a latch circuit 290.

The timer circuit 280 is reset and cleared soon after its counter overflows in the case where the output signal A rises only once. In this case, the latest value stored in the latch circuit 290 is used for the period Tc.

The output signal from the latch circuit 290 is input to each of the bases of transistors $Tr_1$, $Tr_2$, $Tr_3$, and $Tr_4$ which are connected in series with respective resistances $R_1$, $R_2$, $R_3$, and $R_4$ of both the retriggerble one-shot multibiblator 230 and the one-shot multibiblator 240. Then, the transistors are turned on by the output signal. Time constants of the retriggerble one-shot multibiblator 230 and the one-shot multibiblator 240 are set by the CR circuits which combine one or more resistances with condensers.

Namely, suppose that the resistances $R_1$, $R_2$, $R_3$, and $R_4$ are 100 kΩ, (½)100 kΩ (¼)100 kΩ, and (⅛)100 kΩ, respectively and further suppose that the output from the latch circuit 290 is denoted by (1, 1, 1, 1), all the transistors $Tr_1$, $Tr_2$, $Tr_3$, and $Tr_4$ turns on. The total resistance is obtained by the equation. $[1/\{1+2+4+8\}]100$ kΩ because of parallel connection.

As the example above shows, the time constant of the retriggerble one-shot multibiblator 230 equal to the time interval of the pulses of the turn signal is set based on the total resistance and the capacitance of condenser $C_0$. Also, the time constant of the one-shot multibiblator 240 which is longer than that of the retriggerble one-shot multibiblator 230 is set based on the addition of the above-described total resistance to the resistance of R5 and the capacitance of the condenser $C_0$.

The time constant of the retriggerble one-shot multibiblator 230 corresponds to a predetermined time Ta. The time constant of the one-shot multibiblator 240 corresponds to a judgment time Tj at which detects the level transfer is detected for duration judgment of on-off signals. The one-shot multibiblator 240 corresponds to the level transfer judgment means.

The output signal B from the output terminal (Q) of the retriggerble one-shot multibiblator 230 is input to the input terminal (T) of the one-shot multibiblator 240. The output signal E from the output terminal (–Q) of the retriggerble one-shot multibiblator 230 is input to the input terminal (D) of the flip-flip circuit 250 which corresponds to the level transfer means. Other constituents of the control unit shown in FIG. 9 of this embodiment are as same as those in FIG. 2 of the first embodiment. While the signal G from the one-shot multibiblator 260 is input to the display circuit 270, its transistor is on-state and a display on the panel 11 is carried out.

Figure 10:
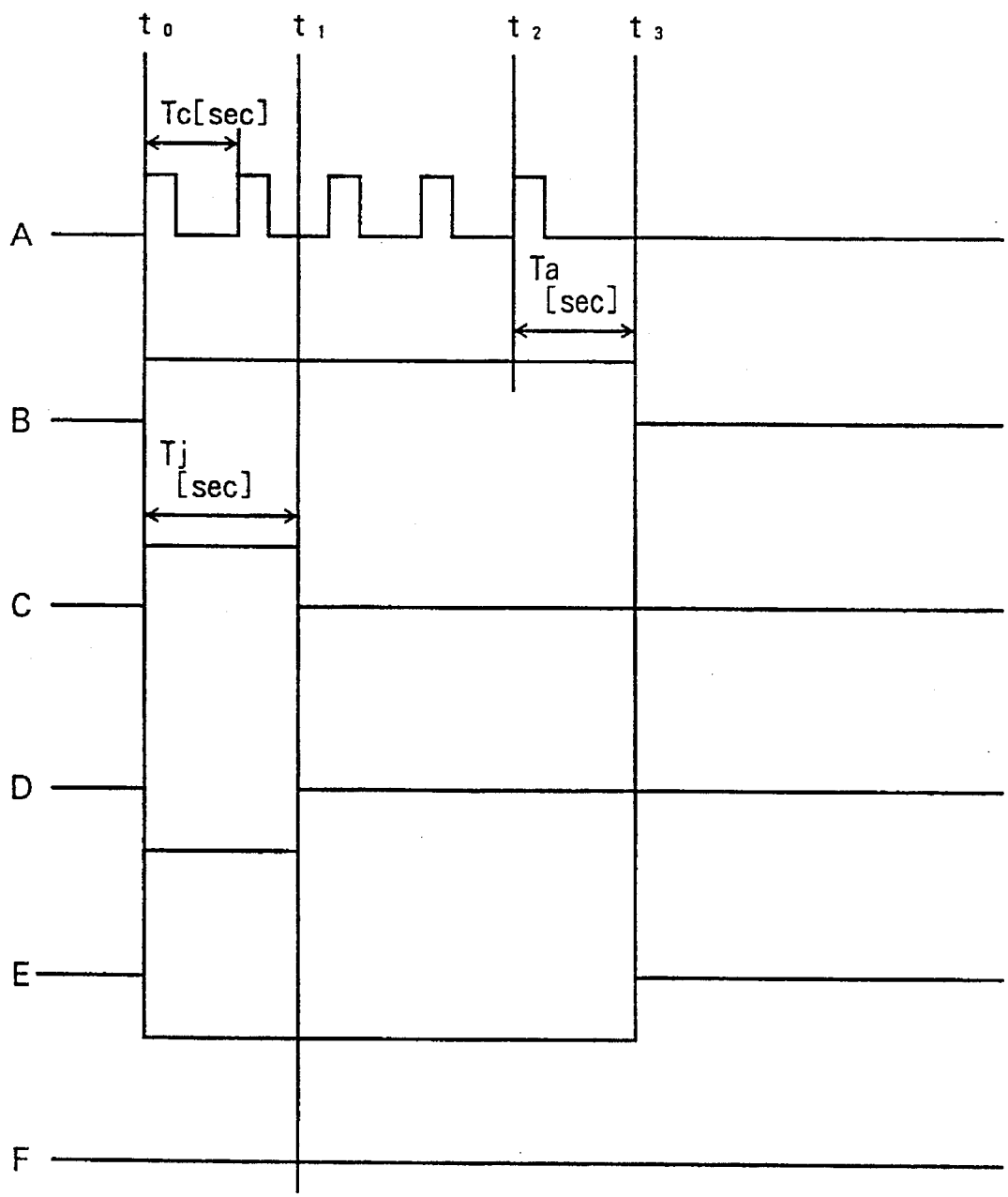
FIG. 10 is a timing chart showing signal conditions of each signal line when a turn signal is input into the control unit in FIG. 9 more than once for turning direction in the third embodiment.

First, with reference to FIG. 10, the operation of the control unit of this embodiment is exemplified when a car turns ordinarily.

In this embodiment, the predetermined time Ta and the reference time Tj are set based on a period Tc of the on-off signal X which is actually detected. Other than that, the device in this embodiment functions as same as that in the first embodiment.

The output signal A comprises a rectangular wave repeated by period Tc. The output signal B from the retriggerble one-shot multibiblator 230 rises simultaneously with the first rising of the rectangular wave of the signal A at $t_0$, and is reset and started at every rising of the rectangular wave with period Tc. Then, the signal B falls at $t_3$ when the predetermined time Ta has passed from rising of the fifth and last rectangular wave of the signal A at $t_2$. Namely, the signal B becomes a duration signal at high level during the period of $t_0$ to $t_3$. On the contrary to the signal B, the signal E output from the retriggerble one-shot multibiblator 230 becomes inverse in level.

The output signal C from the one-shot multibiblator 240 rises and starts simultaneously with rising of the signal A at $t_0$ and falls at $t_1$ which is set by the time constant Tj. Namely, the signal C keeps high level during the period $t_0$ to $t_1$ and the duration functions as a reference time to detect level transfer of the on-off signal. The reference time Tj and the predetermined time Ta are satisfied with a relation Tj>Ta. On the contrary to the signal C, the signal D output from the one-shot multibiblator 240 becomes inverse in level.

The voltages of the signals D and E keep low level during the period of $t_0$ to $t_1$ and $t_0$ to $t_3$ in the flip flop circuit 250, respectively. As a result, the signal F output from the output terminal (Q) of the flip-flop circuit 250 remains at low level since the voltage of the input terminal (D) is low level at the time $t_1$ when the voltage of the clock input terminal (CK) transfers from low to high.

Suppose that the turn signal S is input twice and that two rectangular waves are output from the wave-form shaping circuit 210 as the signal A. Then, the signal 8 keeps high level from $t_0$ to (Tc–Ta) and so does the signal C from $t_0$ to $t_1$. Since the relation of Tc, Ta, and Tj satisfies a formula, (Tc–Ta)>Tj, the signal F does not transfer to high level.

Figure 11:
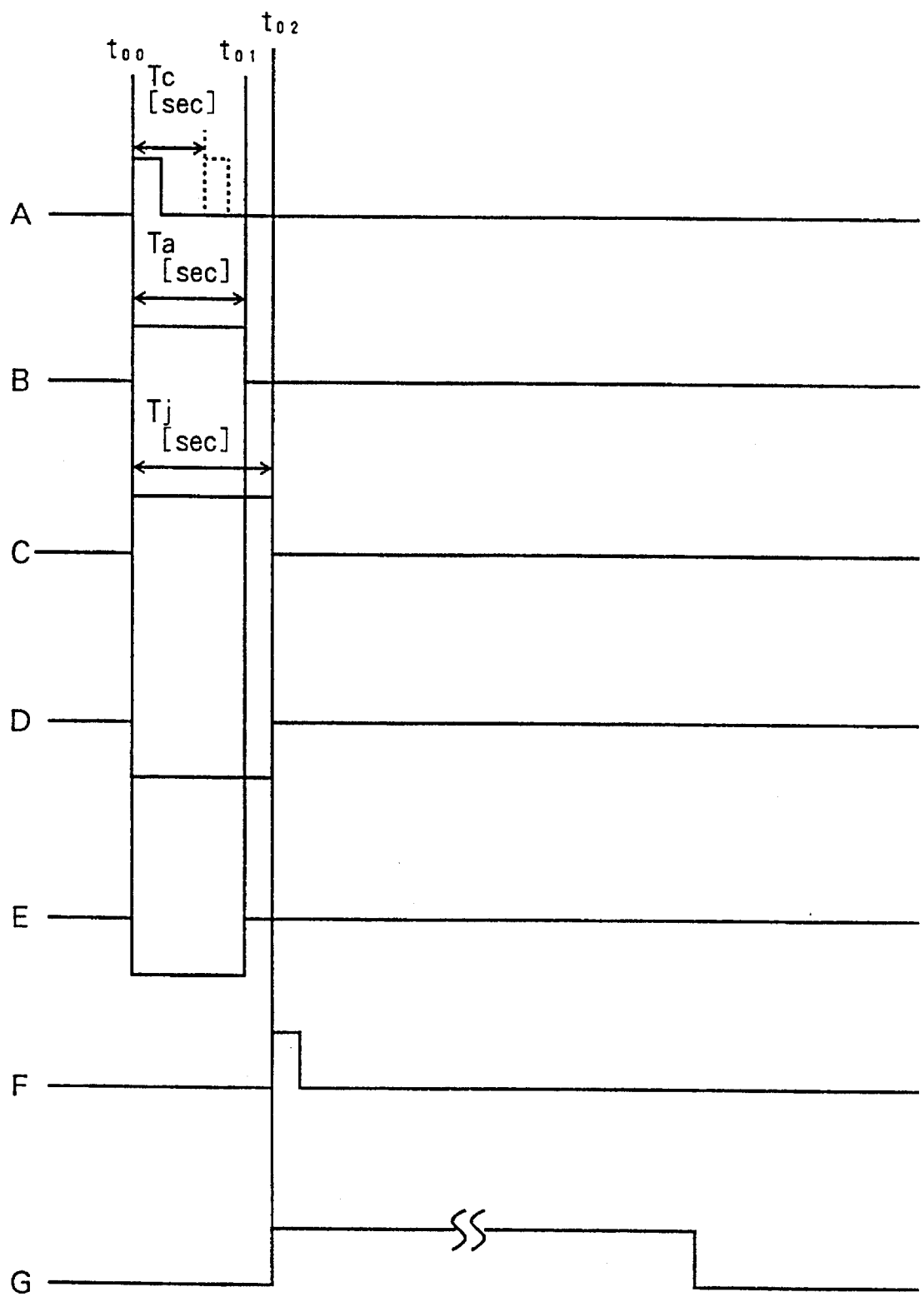
FIG. 11 is a timing chart showing signal conditions of each signal line when a turn signal is input into the control unit in FIG. 9 once for actuating the display in the third embodiment.

Second, with reference to FIG. 11, a case of actuating the display device in this embodiment is explained.

Suppose that only one rectangular wave as the signal A is output by either of the turn signals $S_R$ and $S_L$ shaped by either of the wave form shaping circuits 210R and 210L.

Then, the signal B from the retriggerble one-shot multibiblator 230 rises simultaneously with rising of the signal A at $t_{00}$ and falls at $t_{01}$ after the predetermined time Ta has passed. Namely, the signal B becomes a duration signal during $t_{00}$ to $t_{01}$ keeping high level.

On the contrary to the signal B, the signal E from the retriggerble one-shot multibiblator 230 becomes inverse in level.

The signal C from the one-shot multibiblator 240 rises simultaneously with rising of the signal A at $t_{00}$ and falls at $t_{02}$ which is set by the time constant of the multibiblator. Namely, the signal C keeps high level from $t_{00}$ to $t_{02}$ and the duration functions as a reference time Tj which detects level transfer of the on-off signal. The relation between the reference time Tj and the predetermined time Ta satisfies the formula, Tj>Ta. On the contrary to the signal C. the signal D from the one-shot multibiblator 240 becomes inverse in level.

The signal D keeps low level from $t_{00}$ to $t_{02}$ in the flip-flop circuit 250 and so does the signal E from $t_{00}$ to $t_{01}$. In result, the voltage of the input terminal (D) has transferred from low level to high at $t_{02}$ when the voltage level of the clock input terminal (CK) transfers from low to high. The signal F output from the output terminal (Q) of the flip-flop circuit 250 rises from low to high level at $t_{02}$ and becomes a pulse signal with a certain width since the flip-flop circuit 250 is reset simultaneously with rising of the signal F.

Then, the signal G from the one-shot multibiblator 260 rises simultaneously with rising of the signal F at $t_{02}$ and falls after a certain period, e.g., five seconds. Namely, the signal G is being output to the display circuit 270 during the certain period resulting in actuating the display device 10 during the period.

As described earlier, the third embodiment can also obtain as same effects as the first and second embodiments.

EXAMPLE 4

The display lamp in this embodiment does not use the display 10 as described in the former embodiments but uses the turn signal lamps $L_L$ and $L_R$ at the back (shown in FIG. 1) and turn signal lamps at the front (not shown). Simultaneous flashing of those turn signals can convey appreciations of a driver to a succeeding car.

Figure 12:
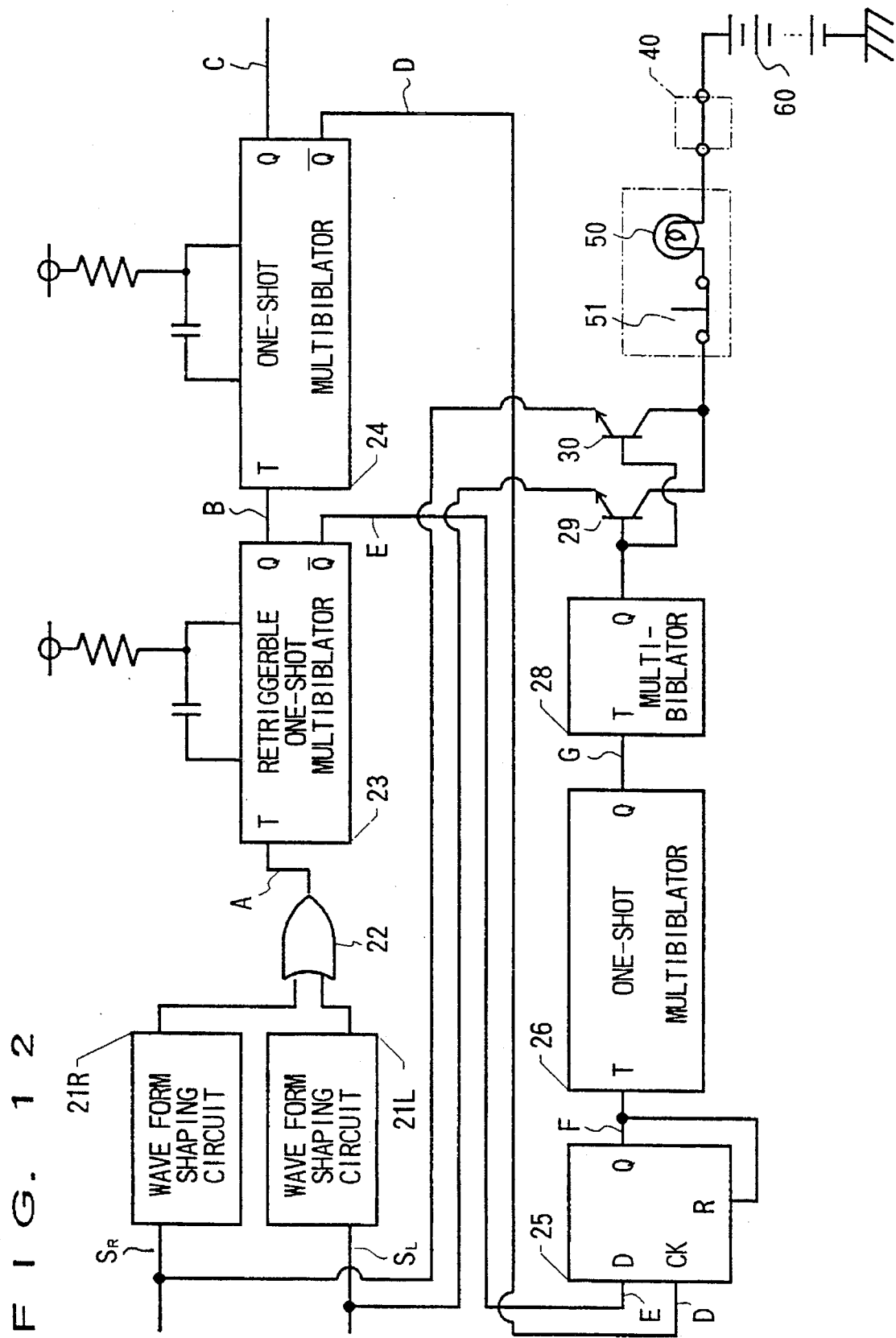
FIGS. 12 and 13 are block diagrams showing control units of display devices in the fourth embodiment of this invention.
Figure 13:
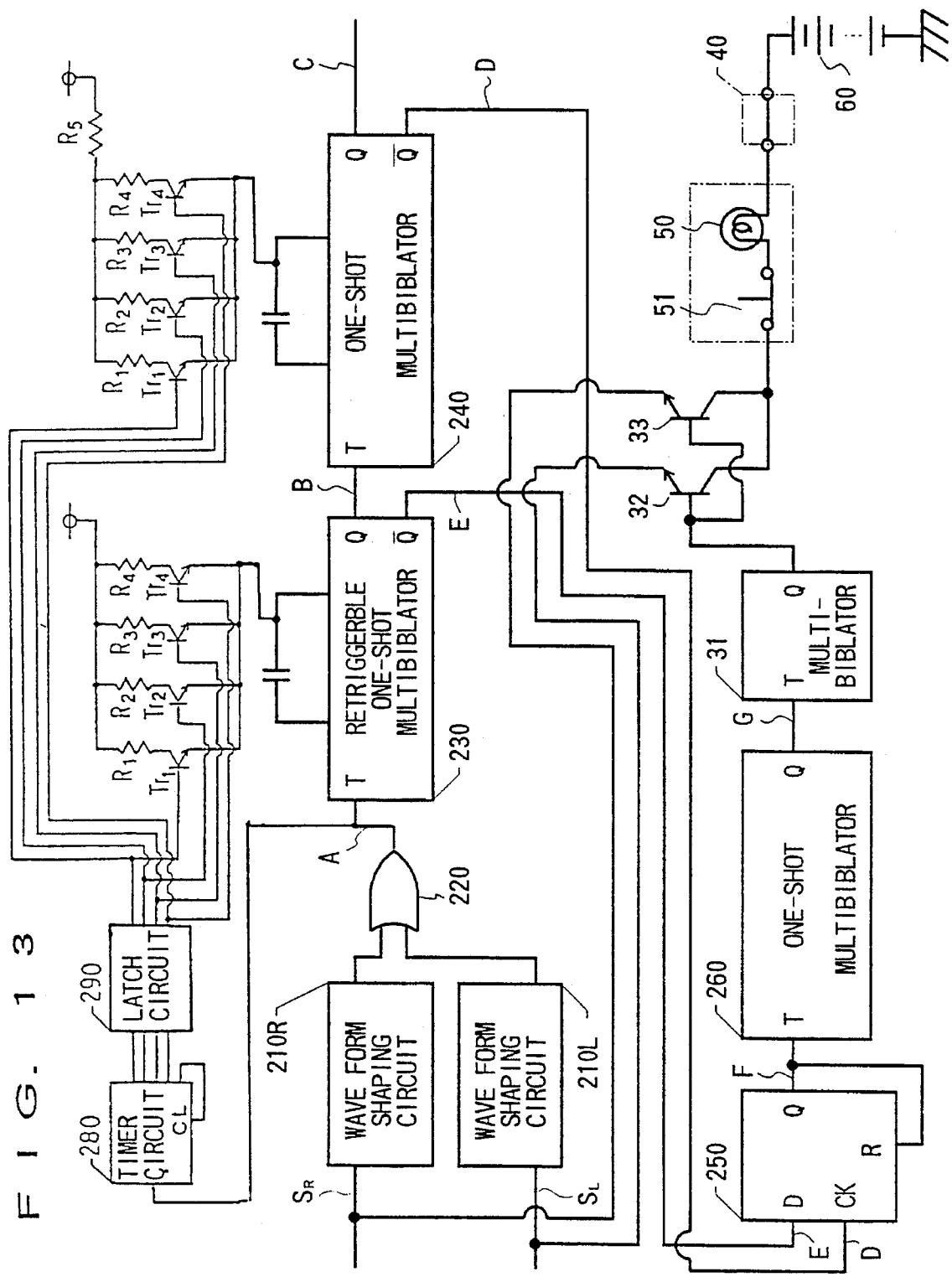

FIGS. 12 and 13 are the devices in this forth embodiment which are modified from those in the first and third embodiments, respectively. With reference to FIG. 12, the multibiblator 28 repeatedly outputs rectangular waves to the transistors 29 and 30 which turn on and off while high level of the signal G from the one-shot multibiblator 26 is input to the multibiblator 28. Similarly, referring to FIG. 13, the multibiblator 31 repeatedly outputs rectangular waves to the transistors 32 and 33 which turn on and off while the high level of the signal G from the one-shot multibiblator 260 is input to the multibiblator 31.

In both cases, turn signal lamps $L_L$ and $L_R$ are supplied with current by the battery 60. Further, each of the turn signal lamps at the front is respectively connected to each of the turn signal lamps $L_L$ and $L_R$ at the back in parallel. Namely, all of the turn signal lamps are supplied with intermittent current and are being flashed during a predetermined time, simultaneously. That flashing lights convey appreciation to the driver in a succeeding car. Since the turn signal lamps $L_L$ and $L_R$ flash repeatedly more than once in this case, the flashing does not function as a starting signal for the display lamp.

What is claimed is:

1. A car display device comprising:

detection means for detecting an on-off signal with a predetermined period to flash turn signal lamps; and control means connected with said detection means for inputting said on-off signal and a display for actuating said display for a predetermined display time when only one pulse of said on-off signal is detected, said isolated pulse not being continuous to other pulses within a first predetermined time longer than one period and shorter than two periods of said predetermined period of said on-off signal wherein said control means comprises:

first timer which outputs duration signals (B, E) showing a duration in which said on-off signal is continuously output, said duration being determined by resetting and restarting said first timer in synchronization with each of level transfers with a predetermined direction of said on-off signal to measure said first predetermined time which is longer than one period and shorter than two periods of said on-off signal:

second timer which outputs a reference signal (D) showing a reference time when a second predetermined time passed after the beginning of said duration shown by said duration signal B, said reference time being determined by resetting and restarting said second timer in synchronization with the beginning of said duration of said duration signal to measure said second predetermined time which is longer than said first predetermined time of said first timer and shorter than two periods of said on-off signal; and signal output means which outputs a display signal (G) for said predetermined display time to actuate said display device when it is judged from both said duration signal (E) and said reference signal that said duration is over at said reference time.

2. The car display device according to claim 1, wherein said display corresponds to said turn signal lamps, and said control means further comprises oscillation means which outputs an intermittent display signal to flash said turn signal lamps for said predetermined display time, simultaneously.

3. A car display device comprising:

detection means for detecting an on-off signal with a predetermined period to flash turn signal lamps; and control means connected with said detection means for inputting said on-off signal and a display for actuating said display for a predetermined display time when only one pulse of said on-off signal is detected, said isolated pulse not being continuous to other pulses within a first predetermined time longer than one period and shorter than two periods of said predetermined period of said on-off signal wherein said control means comprises:

timer means which decides a duration in which said on-off signal is continuously output, said duration being determined by resetting and restarting said timer means in synchronization with each of level transfers with a predetermined direction of said on-off signal to measure said first predetermined time which is longer than one period and shorter than two periods of said on-off signal;

level transfer detection means which detects said level transfer of said on-off signal while said timer means is measuring time in said duration; and signal output means which outputs a display signal for said predetermined display time to actuate said display when said predetermined time has passed without any detections of said level transfer by said level transfer detection means.

4. The car display device according to claim 3, wherein said display corresponds to said turn signal lamps, and said control means further comprises oscillation means which outputs an intermittent display signal to flash said turn signal lamps for said predetermined display time, simultaneously.

5. A car display device comprising:

detection means for detecting an on-off signal with a predetermined period to flash turn signal lamps; and control means connected with said detection means for inputting said on-off signal and a display for actuating said display for a predetermined display time when only one pulse of said on-off signal is detected, said isolated pulse not being continuous to other pulses within a first predetermined time longer than one period and shorter than two periods of said predetermined period of said on-off signal wherein said control means comprises:

period detection means which detects a period of level transfer of said on-off signal to flash said turn signal lamps;

timer means which decides a duration in which said on-off signal is continuously output, said duration being determined by resetting and restarting said timer means in synchronization with each of level transfers with a predetermined direction of said on-off signal to measure said first predetermined time which is longer than one period and shorter than two periods of said on-off signal;

level transfer detection means which detects said level transfer of said on-off signal while said timer means is measuring time in said duration; and signal output means which outputs a display signal for said predetermined display time to actuate said display when said predetermined time has passed without any detections of said level transfer by said level transfer detection means.

6. The car display device according to claim 5, wherein said display corresponds to said turn signal lamps, and said control means further comprises oscillation means which outputs an intermittent display signal to flash said turn signal lamps for said predetermined display time, simultaneously.

* * * * *